United States Patent [19]
Kioka et al.

[11] Patent Number: 5,654,248
[45] Date of Patent: *Aug. 5, 1997

[54] CATALYST FOR POLYMERIZING ALPHA-OLEFINS AND PROCESS FOR POLYMERIZATION

[75] Inventors: Mamoru Kioka; Akinori Toyota; Norio Kashiwa, all of Iwakuni; Toshiyuki Tsutsui, Ohtake, all of Japan

[73] Assignee: Mitsui Petrochemical Industries, Ltd., Tokyo, Japan

[*] Notice: The term of this patent shall not extend beyond the expiration date of Pat. No. 5,126,301.

[21] Appl. No.: 433,545

[22] Filed: May 2, 1995

Related U.S. Application Data

[62] Division of Ser. No. 227,590, Apr. 14, 1994, abandoned, which is a continuation of Ser. No. 987,545, Dec. 7, 1992, abandoned, which is a continuation of Ser. No. 196,081, filed as PCT/JP87/00629, Aug. 26, 1987, abandoned.

[30] Foreign Application Priority Data

| Aug. 26, 1986 | [JP] | Japan | 61-198037 |
| Aug. 26, 1986 | [JP] | Japan | 61-198038 |
| Sep. 1, 1986 | [JP] | Japan | 61-203638 |
| Feb. 19, 1987 | [JP] | Japan | 62-34591 |

[51] Int. Cl.⁶ ............ B01J 31/00; B01J 37/00; C08F 4/02; C08F 4/60
[52] U.S. Cl. ............ 502/108; 502/103; 502/117; 526/160
[58] Field of Search ............ 502/103, 117, 502/113, 114, 108

[56] References Cited

U.S. PATENT DOCUMENTS

| 3,030,395 | 4/1962 | Giddings | 260/429.5 |
| 3,104,249 | 9/1963 | Clauss et al. | 260/429.5 |
| 3,242,099 | 3/1966 | Manyik et al. | 252/429 |
| 3,893,989 | 7/1975 | Leicht et al. | 260/93.7 |
| 4,035,560 | 7/1977 | Caumartin et al. | 526/124 |
| 4,190,614 | 2/1980 | Ito et al. | 526/106 |
| 4,276,400 | 6/1981 | Bissell | 526/152 |
| 4,298,713 | 11/1981 | Morita et al. | 526/75 |
| 4,404,344 | 9/1983 | Sinn et al. | 526/160 |
| 4,435,550 | 3/1984 | Ueno et al. | 526/73 |
| 4,478,951 | 10/1984 | Huff | 502/108 |
| 4,525,547 | 6/1985 | Kato et al. | 526/68 |
| 4,530,914 | 7/1985 | Ewen et al. | 502/113 |
| 4,542,199 | 9/1985 | Kaminsky et al. | 526/160 |
| 4,564,647 | 1/1986 | Hayashi et al. | 523/211 |
| 4,579,836 | 4/1986 | Arzoumanidis et al. | 502/133 |
| 4,618,662 | 10/1986 | Nowlin | 526/129 |
| 4,701,432 | 10/1987 | Welborn, Jr. | 502/113 |
| 4,721,763 | 1/1988 | Bailly et al. | 502/108 |
| 4,808,561 | 2/1989 | Welborn, Jr. | 502/104 |
| 4,952,540 | 8/1990 | Kioka | 502/8 |
| 5,126,301 | 6/1992 | Tsutsui et al. | 502/132 |
| 5,206,199 | 4/1993 | Kioka | 502/117 |

FOREIGN PATENT DOCUMENTS

| 220436 | 2/1959 | Australia . |
| 0129368 | 12/1984 | European Pat. Off. . |
| 59-213706 | 12/1984 | Japan . |
| 1300734 | 12/1972 | United Kingdom . |
| 2024832 | 1/1980 | United Kingdom . |

OTHER PUBLICATIONS

Matkovshii, et al., Polymer Science (USSR), vol. 16, No. 1 (1974), pp. 207–215.

*Primary Examiner*—Glenn A. Caldarola
*Assistant Examiner*—J. Pasterczyk
*Attorney, Agent, or Firm*—Sherman and Shalloway

[57] ABSTRACT

A prepolymerized solid catalyst for gaseous phase or slurry polymerization of alpha olefins is disclosed. The catalyst comprises a porous carrier having a particle size of 20 to 200 microns onto which has been deposited an aluminoxane and a transition metal compound having at least one cycloalkadienyl group, the transition metal being from group 4 of the Periodic Table. The transition metal is present in an amount of 0.003 to 3 mmol/gm of carrier, and the aluminum to transition metal atomic ratio is from 15 to 1000. This catalyst is then prepolymerized with 0.2 to 30 gm of an alpha olefin per gram of catalyst to form the final prepolymerized solid catalyst having an intrinsic viscosity of 0.2 to 20 dl/gm as measured in decalin at 135 deg C.

1 Claim, No Drawings

CATALYST FOR POLYMERIZING ALPHA-OLEFINS AND PROCESS FOR POLYMERIZATION

This is a division of application Ser. No. 08/227,590 filed Apr. 14, 1994, now abandoned; which is a continuation of application Ser. No. 07/987,545, filed Dec. 7, 1992, now abandoned; which is a continuation of application Ser. No. 07/196,081 filed Apr. 19, 1988, now abandoned; which is the national phase entry of International Application No. PCT/JP87/00629, filed Aug. 26, 1987.

TECHNOLOGICAL FIELD

This invention relates to a catalyst for polymerization of alpha-olefins, and to a polymerization process. More specifically, it relates to a catalyst for polymerization of alpha-olefins which by a slurry polymerization method or a vapor-phase polymerization method, particularly the latter, can give a spherical polymer having a good particle size distribution and an excellent bulk density, and to a polymerization process using the aforesaid catalyst. Furthermore, it relates to a catalyst for polymerization of alpha-olefins which when applied to the copolymerization of at least two olefins, exhibits high polymerization activity and gives an olefin copolymer having a narrow molecular weight distribution and a narrow composition distribution, and to a polymerization process using the catalyst.

BACKGROUND TECHNOLOGY

For the production of an alpha-olefin polymer, particularly an ethylene polymer or an ethylene/alpha-olfein copolymer, methods have previously been known in which ethylene is polymerized, or ethylene and an alpha-olefin are copolymerized, in the presence of a titanium-containing catalyst comprising a titanium compound and an organoaluminum compound or a vanadium-containing catalyst comprising a vanadium compound and an organoaluminum compound.

On the other hand, catalysts comprising a zirconium compound and an aluminoxane have been proposed recently as a new type of Ziegler catalyst for olefin polymerization.

Japanese Laid-Open Patent Publication No. 19309/1983 discloses a process which comprises polymerizing ethylene and at least one alpha-olefin having 3 to 12 carbon atoms at a temperature of −50° C. to 200° C. in the presence of a catalyst composed of a transition metal-containing catalyst represented by the following formula (cyclopentadienyl)$_2$MR$^1$Hal wherein R$^1$ represents cyclopentadienyl, C$_1$–C$_8$ alkyl or halogen, M represents a transition metal, and Hal represents halogen,
with a linear aluminoxane represented by the following formula Al$_2$OR$_4{}^2$(Al(R$^2$)—O)$_n$ wherein R$^2$ represents methyl or ethyl, and
n is a number of 4 to 20,
or a cyclic aluminoxane represented by the following formula

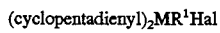

wherein R$^2$ and n are as defined above.

This patent document states that in order to adjust the density of the resulting polyethylene, ethylene should be polymerized in the presence of a small amount (up to 10% by weight) of a slightly long-chain alpha-olefin or a mixture thereof.

Japanese Laid-Open Patennt Publication No. 95292/1984 describes an invention relating to a process for producing a linear aluminoxane represented by the following formula

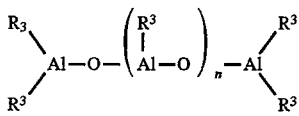

wherein n is 2 to 40 and R$^3$ is C$_1$–C$_8$ alkyl, and a cyclic aluminoxane represented by the following formula

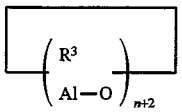

wherein n and R are as defined above.

This Publication states that when an olefin is polymerized using a mixture of methylaluminoxane produced by the above process with a bis(cyclopentadienyl) compound of titanium or zirconium, polyethylene is obtained in an amount of at least 25 million grams per gram of the transition metal per hour.

Japanese Laid-Open Patent Publication No. 35005/1985 discloses a process for producing a catalyst for polymerization of olefins, which comprises reacting an aluminoxane compound represented by the following formula

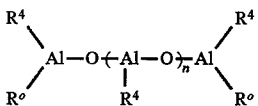

wherein R$^4$ represents C$_1$–C$_{10}$ alkyl, and
R$^o$ is R$^4$ or is bonded to represent —O—, with a magnesium compound, then chlorinating the reaction product, and treating the chlorinated product with a compound of Ti, V, Zr or Cr. The above Publication describes that the above catalyst is especially suitable for the copolymerization of ethylene with a C$_3$–C$_{12}$ alpha-olefin mixture.

Japanese Laid-Open Patent Publication No. 35006/1985 discloses a combination of (a) a mono-, di- or tri-pentadienyl compound of at least two dissimilar transition metals or its derivative with (b) alumoxane (aluminoxane) as a catalyst system for polymers blended in a reactor. Example 1 of this Publication discloses that polyethylene having a number average molecular weight of 15,300 and a weight average molecular weight of 36,400 and containing 3.4% of a propylene component was obtained by polymerizing ethylene and propylene using bis(pentamethylcyclopentadienyl) dimethyl zirconium and alumoxane as a catalyst. In Example 2 of this Publication, a blend consisting of polyethylene and an ethylene/propylene copolymer and having a number average molecular weight of 2,000, a weight average molecular weight of 8,300 and a propylene component content of 7.1 mole % and consisting of a toluene-soluble portion having a number average molecular weight of 2,200, a weight average molecular weight of 11,900 and a propylene component content of 30 mole % and a toluene-insoluble portion having a number average molecular weight of 3,000, a weight average molecular weight of 7,400 and a propylene component content of 4.8 mole % was obtained by polymerizing ethylene and propylene using bis (pentamethylcyclopentadieneyl)zirconium dichloride, bis (methylcyclopentadienyl)zirconium dichloride and alumoxane as a catalyst. Likewise, Example 3 of this Publication describes a blend of LLDPE and an ethylene/propylene copolymer composed of a soluble portion having a molecular weight distribution ($\overline{Mw}/\overline{Mn}$) of 4.57 and a propylene component content of 20.6 mole % and an insoluble portion having a molecular weight distribution of 3.04 and a propylene component content of 2.9 mole %.

Japanese Laid-Open Patent Publication No. 35007/1985 describes a process which comprises polymerizing ethylene alone or with an alpha-olefin having at least 3 carbon atoms in the presence of a catalyst system comprising a metallocene and a cyclic alumoxane represented by the following formula

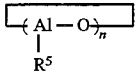

wherein $R^5$ represents an alkyl group having 1 to 5 carbon atoms, and n is an integer of 1 to about 20, or a linear alumoxane represented by the following formula

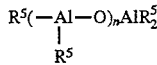

wherein $R^5$ and n are as defined above.

The Publication describes that the polymer obtained by the above process has a weight average molecular weight of about 500 to about 1,400,000 and a molecular weight distribution of 1.5 to 4.0.

Japanese Laid-Open Patent Publication No. 35008/1985 describes that polyethylene or a copolymer of ethylene and a $C_3$–$C_{10}$ alpha-olefin having a wide molecular weight distribution is produced by using a catalyst system comprising at least two types of metallocenes and alumoxane. The Publication states that the above copolymer has a molecular weight distribution ($\overline{Mw}/\overline{Mn}$) of 2 to 50.

These catalysts formed from transition metal compounds and aluminoxanes have much higher polymerization activity than the catalyst systems known heretofore.

On the other hand, methods using catalysts formed from solid catalyst components composed of the above transition metal compounds supported on porous inorganic oxide carriers such as silica, silica-alumina and alumina and aluminoxanes are proposed in Japanese Laid-Open Patent Publications Nos. 35006/1985, 35007/1985 and 35008/1985 which are cited above. Japanese Laid-Open Patent Publications Nos. 31404/1986, 108610/1986 and 106808/1985 propose methods using solid catalyst components supported on similar porous inorganic oxide carriers.

It is an object of this invention to provide a catalyst for polymerizing alpha-olefins, which has excellent polymerization activity and gives an ethylene polymer or an ethylene/alpha-olefin copolymer having excellent powder characteristics and a narrow molecular weight distribution or composition distribution, and when applied to the copolymerization of at least two olefins, gives an olefin copolymer having a narrow molecular weight distribution and composition distribution.

Another object of this invention is to provide a process for producing an ethylene polymer or an ethylene/alpha-olefin copolymer having the aforesaid properties by polymerizing or copolymerizing alpha-olefins using the catalyst of this invention.

According to this invention, these objects and advantages are firstly achieved by a catalyst for polymerization of alpha-olefins, said catalyst being formed by using a solid catalyst comprising (A) a solid catalyst component composed of a compound of a transition metal of Group IVB of the periodic table supported on a carrier, and (B) an aluminoxane, in pre-polymerization of an olefin.

The catalyst of this invention is formed from the solid catalyst component (A) and the aluminoxane (B).

The catalyst component (A) is a solid catalyst component composed of a compound of a transition metal of Group IVB of the periodic table supported on a carrier.

The transition metal of Group IVB of the periodic table in the catalyst component (A) is preferably selected from the group consisting of titanium, zirconium and hafnium. Titanium and zirconium are more preferred, and zirconium is especially preferred.

The compound of a transition metal of Group IVB of the periodic table in the catalyst component (A) preferably has a group having a conjugated π electron as a ligand.

Examples of the transition metal compound having a group with a conjugated π electron as a ligand are compounds represented by the following formula (I)

$$R_k^1 R_l^2 R_m^3 R_n^4 M \qquad (I)$$

wherein $R^1$ represents a cycloalkadienyl group, $R^2$, $R^3$ and $R^4$ are identical or different and each represents a cycloalkadienyl group, an aryl group, an alkyl group, a cycloalkyl group, an aralkyl group, a halogen atom, a hydrogen atom, or a group of the formula —$OR^a$, —$SR^b$ or —$NR_2^c$ in which each of $R^a$, $R^b$ and $R^c$ represents an alkyl group, a cycloalkyl group, an aryl group, an aralkyl group or an organic silyl group, M represents zirconium, titanium or hafnium, k is 1, 2, 3 or 4, l, m and n are each 0, 1, 2 or 3, and k+l+m+n=4.

Examples of the cycloalkadienyl group represented by $R^1$ are a cyclopentadienyl group, a methylcyclopentadienyl group, an ethylcyclopentadienyl group, a dimethylcyclopentadienyl group, an indenyl group and a tetrahydroindenyl group. Examples of the cycloalkadienyl group represented by $R^2$, $R^3$ and $R^4$ may be the same as above.

The aryl group represented by $R^2$, $R^3$ and $R^4$ is preferably a phenyl or tolyl group, for example.

Likewise, preferred examples of the aralkyl group are benzyl and neophile groups.

Examples of preferred alkyl groups are methyl, ethyl, propyl, isopropyl, butyl, hexyl, octyl, 2-ethylhexyl, decyl and oleyl groups.

Preferably, the cycloalkyl group may be, for example, a cyclopentyl, cyclohexyl, cyclooctyl, or norbornyl group.

The halogen atom may be, for example, fluorine, chlorine or bromine.

Specific examples of the groups —$OR^a$, —$SR^b$ and —$NR_2^c$ where $R^a$, $R^b$ and $R^c$ are alkyl cycloalkyl, aryl and aralkyl will be clear from the above specific examples of these groups.

Examples of the organic silyl group for $R^a$, $R^b$ and $R^c$ are trimethylsilyl, triethylsilyl, phenyldimethylsilyl, diphenylmethylsilyl and triphenylsilyl groups.

Examples of zirconium compounds corresponding to formula (I) in which Me is zirconium are listed below:

bis(cyclopentadienyl) zirconium monochloride monohydride,
bis(cyclopentadienyl)zirconium monobromide monohydride,
bis(cyclopentadienyl)methylzirconium hydride,
bis(cyclopentadienyl)ethylzirconium hydride,
bis(cyclopentadienyl)cyclohexylzirconium hydride,
bis(cyclopentadienyl)phenylzirconium hydride,
bis(cyclopentadienyl)benzylzirconium hydride,
bis(cyclopentadienyl)neopentylzirconium hydride,
bis(methylcyclopentadienyl)zirconium monochloride monohydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzrconium monochloride,
bis(cyclopentadienyl)cyclohexylzirconium monochloride,
bis(cyclopentadienyl)phenylzirconium monochloride,
bis(cyclopentadienyl)benzylzirconium monochloride,
bis(methylcyclopentadienyl)zirconium dichloride,
bis(indenyl)zirconium dichloride,
bis(indenyl)zirconium dibromide,
bis(cyclopentadienyl)diphenylzirconium,
bis(cyclopentadienyl)benzylzirconium,
bis(cyclopentadienyl)methoxyzirconium chloride,
bis(cyclopentadienyl)ethoxyzirconium chloride,
bis(cyclopentadienyl)butoxyzirconium chloride,
bis(cyclopentadienyl)2-ethylhexoxyzirconium chloride,
bis(cyclopentadienyl)methylzirconium ethoxide,
bis(cyclopentadienyl)methylzirconium butoxide,
bis(cyclopentadienyl)ethylzirconium ethoxide,
bis(cyclopentadienyl)phenylzirconium ethoxide,
bis(cyclopentadienyl)benzylzirconium ethoxide,
bis(methylcyclopentadienyl)ethoxyzirconium chloride,
bis(indenyl)ethoxyzirconium chloride,
bis(cyclopentadienyl)ethoxyzirconium,
bis(cyclopentadienyl)butoxyzirconium,
bis(cyclopentadienyl)2-ethylhexoxyzirconium,
bis(cyclopentadienyl)phenoxyzirconium chloride,
bis(cyclopentadienyl)cyclohexoxyzirconium chloride,
bis(cyclopentadienyl)phenylmethoxyzirconium chloride,
bis(cyclopentadienyl)methylzirconium phenylmethoxide,
bis(cyclopentadienyl)trimethylsiloxyzirconium chloride,
bis(cyclopentadienyl)triphenylsiloxyzirconium chloride,
bis(cyclopentadienyl)thiophenylzirconium chloride,
bis(cyclopentadienyl)thioethylzirconium chloride,
bis(cyclopentadienyl)bis(dimethylamide)zirconium,
bis(cyclopentadienyl)diethylamidezirconium chloride,
ethylenebis(indenyl)ethoxyzirconium chloride,
ethylenebis(4,5,6,7-tetrahydro-1-indenyl) ethoxyzirconium chloride,
ethylenebis(indenyl)dimethylzirconium,
ethylenebis(indenyl)diethylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl) dimethylzirconium,
ethylenebis(4,5,6,7-tetrahydro-1-indenyl) methylzirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis((indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium diethoxide,
ethylenebis(4,5,6,7-tetrahydro-1-indenyl) methoxyzirconium chloride
ethylenebis(4,5,6,7-tetrahydro-1-indenyl) ethoxyzirconium chloride, and
ethylenebis(4,5,6,7-tetrahydro-1-indenyl) methylzirconium ethoxide.

Examples of titanium compounds corresponding to formula (I) in which Me is titanium are listed below:

bis(cyclopentadienyl)titanium monochloride monohydride,
bis(cyclopentadienyl)methyltitanium hydride,
bis(cyclopentadienyl)phenyltitanium chloride,
bis(cyclopentadienyl)benzyltitanium chloride,
bis(cyclopentadienyl)titanium chloride,
bis(cyclopentadienyl)dibenzyltitanium,
bis(cyclopentadienyl)ethoxytitanium chloride,
bis(cyclopentadienyl)butoxytitanium chloride,
bis(cyclopentadienyl)methyltitanium ethoxide,
bis(cyclopentadienyl)phenoxytitanium chloride,
bis(cyclopentadienyl)trimethylsiloxytitanium chloride,
bis(cyclopentadienyl)thiophenyltitanium chloride,
bis(cyclopentadienyl)bis(dimethylamide)titanium,
bis(cyclopentadienyl)ethoxytitanium,
ethylenebis(indenyl)titanium dichloride, and
ethylenebis(4,5,6,7-tetrahydro-1-indenyl)titanium dichloride.

Examples of hafnium compounds corresponding to formula (I) in which Me is hafnium are listed below:

bis(cyclopentadienyl)hafnium monochloride monohydride,
bis(cyclopentadienyl)ethylhafnium hydride,
bis(cyclopentadienyl)phenylhafnium chloride,
bis(cyclopentadienyl)hafnium dichloride,
bis(cyclopentadienyl)hafnium dibenzil
bis(cyclopentadienyl)ethoxyhafnium chloride,
bis(cyclopentadienyl)butoxyhafnium chloride,
bis(cyclopentadienyl)methylhafnium ethoxide,
bis(cyclopentadienyl)phenoxyhafnium chloride,
bis(cyclopentadienyl)thiophenylhafnium chloride,
bis(cyclopentadienyl)bis(diethylamide)hafnium,
ethylenebis(indenyl)hafnium dichloride, and
ethylenebis(4,5,6,7-tetrahydro-1-indenyl)hafnium dichloride.

In the catalyst component (A), the IVB transition metal compound may be treated with an organic metal compound prior to supporting. The organic metal compound may be, for example, an organoaluminum compound, an organoboron compound, an organomagnesium compound, an organozinc compound or an organolithium compound. The organoaluminum compound is preferred.

Examples of the organoaluminum compound include trialkylaluminums such as trimethylaluminum, triethylaluminum and tributylaluminum; alkenylaluminums such as isoprenylaluminum; dialkyl aluminum alkoxides such as dimethyl aluminum methoxide, diethyl aluminum ethoxide and dibutyl aluminum butoxide; alkyl aluminum sesquialkoxides such as methyl aluminum sesquimethoxide and ethyl aluminum sesquiethoxide; partially alkoxylated alkylaluminums having an average composition of the formula $R_{2.5}{}^1Al(OR^2)_{0.5}$; dialkyl aluminum halides such as dimethyl aluminum chloride, diethyl aluminum chloride and dimethyl aluminum bromide; alkyl aluminum sesquihalides such as methyl aluminum sesquichloride and ethyl aluminum sesquichloride; partially halogenated alkylaluminums, for example alkyl aluminum dihalides such as methyl aluminum dichloride and ethyl aluminum dichloride.

The trialkylaluminums and dialkyl aluminum chlorides are preferred, and above all trimethylaluminum, triethylaluminum and dimethyl aluminum chloride are preferred.

Triethylboron is a preferred example of the organoboron compound.

Examples of the organomagnesium compound are ethylbutylmagnesium, di-n-hexylmagnesium, ethyl magnesium bromide, phenyl magnesium bromide and benzyl magnesium chloride.

Diethylzinc is a preferred example of the organozinc compound.

Methyllithium, butyllithium and phenyllithium are examples of the organolithium compound.

In the catalyst of this invention, the solid catalyst component (A) is composed of the compound of the transition metal of Group IVB of the periodic table supported on a carrier.

The carrier may be organic or inorganic, and is advantageously a granular or particulate solid having a particle diameter of, for example, 10 to 300 micrometers, preferably 20 to 200 micrometers. A porous oxide is preferred as the inorganic carrier. Specific examples include $SiO_2$, $Al_2O_3$, MgO, $ZrO_2$, $TiO_2$, $B_2O_3$, CaO, ZnO, BaO and $ThO_2$ and mixtures of these, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. A catalyst containing at least one component selected from the group of $SiO_2$ and $Al_2O_3$ as a main component is preferred.

The inorganic oxide may contain a small amount of a carbonate, nitrate, sulfate or an oxide component such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

The porous inorganic carrier preferably used in this invention has a specific surface area of 50 to 1000 m²/g, preferably 100 to 700 m²/g and a pore volume of 0.3 to 2.5 cm²/g, although its characteristics vary depending upon its type and the method of production. The carrier is used after it is calcined usually at 150° to 1000° C., preferably 200° to 800° C.

Granular or particulate solids of organic compounds having a particle diameter of 10 to 300 micrometers may also be used in the present invention. Examples of the organic compounds are (co)polymers containing alpha-olefins having 2 to 14 carbon atoms such as ethylene, propylene, 1-butene, 4-methyl-1-pentene and 1-decene as a main component, and polymers or copolymers containing vinylcyclohexane or styrene as a main component.

The mixing weight ratio of the Group IVB transition metal compound to the carrier (transition metal/carrier) in the supporting reaction in this invention is 0.5 to 15%, preferably 0.8 to 10% by weight, more preferably 1 to 7% by weight.

The supporting may be carried out, for example, by mixing the carrier and the transition metal compound in the presence of an inert solvent, and removing the solvent by using an evaporator, for example, at room temperature or at an elevated temperature under atmospheric pressure or elevated pressure.

It can also be achieved by the following methods, for example.

(1) A method which comprises treating the carrier with an organoaluminum compound such as trimethylaluminum, dimethyl aluminum chloride and aluminoxane or a halogen-containing silicon compound such as trichlorosilane, and mixing the treated carrier with the Group IVB transition metal compound.

(2) A method which comprises treating the Group IVB transition metal compound with an organoaluminum compound such as trimethylaluminum or dimethyl aluminum chloride and then mixing the treated compound with the carrier in the presence of an inert solvent.

(3) A method which comprises mixing the carrier, the Group IVB transition metal compound and the aluminoxane as catalyst component (B), and removing the solvent from the mixture using an evaporator, for example, under atmospheric pressure or reduced pressure.

The catalyst component (B) is an aluminoxane. The aluminoxane used as the catalyst component (B) may be, for example, an organoaluminum compound represented by the following formula (II)

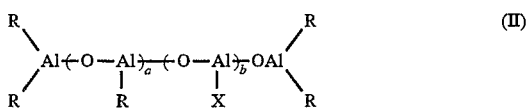

wherein R represents a hydrocarbon group,

X represents a halogen atom, and a and b, independently from each other, are a number of 0 to 80 provided that a and b are not simultaneously zero (in this formula, a+b+2 is the degree of polymerization), or by the following formula

wherein R, X, a, and b are as defined with regard to formula (II) above (in this formula, a+b is the degree of polymerization).

In the above formulae (II) and (III), R represents a hydrocarbon group such as an alkyl, cycloalkyl, aryl or aralkyl group. The alkyl group is preferably a lower alkyl group such as a methyl, ethyl, propyl or butyl group. The cycloalkyl group is preferably a cyclopentyl or cyclohexyl group. The aryl group is preferably a phenyl or tolyl group. Benzyl and neophile groups are preferred examples of the aralkyl group. Among them, the alkyl groups are especially preferred.

X is a halogen atom such as fluorine, chlorine, bromine or iodine. Chlorine is especially preferred.

a and b, independently from each other, represent a number of 0 to 80, provided that a and b are not simultaneously zero.

When b is 0, formula (II) can be written as (II)-1

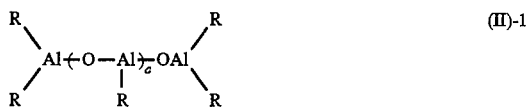

wherein R and a are as defined above.

The formula (III) above may be written as the following formula (III)-1

wherein R and a are as defined above.

In formula (II)-1, a is preferably 2 to 50, more preferably 4 to 30. In formula (III)-1, a is preferably 4 to 52, more preferably 6 to 32.

a is preferably 0 to 40, more preferably 3 to 30, and b is preferably 1 to 40, more preferably 3 to 30.

The a+b value is preferably 4 to 50, more preferably 8 to 30.

In formulae (II) and (III), the two units —O—Al and

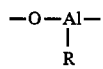

may be bonded in blocks or at random.

When a is 0 in formulae (II) and (III), it is desirable to use an organoaluminum compound of the following formula (V)

wherein $R^7$ represents an alkyl group having 1 to 10 carbon atoms or a cycloalkyl group having 3 to 12 carbon atoms, Z represents a halogen atom, and f is a number of 1 to 3, together with the halogenated aluminoxane. Examples of the organoaluminum compound are trimethylaluminum, triethylaluminum, tributylaluminum, trihexylaluminum, diethylaluminum chloride and ethyl aluminum sesquichloride.

At this time, it is desirable to use 0.1 to 10 moles, preferably 0.3 to 3.0 moles, especially preferably 0.5 to 2.0 moles, of the organoaluminum compound per mole of the aluminum atom of the halogenated aluminoxane.

The following methods may be cited as examples of producing the aluminoxane or the halogenated aluminoxane.

(1) A method which comprises reacting a compound containing water of adsorption or a salt containing water of crystallization, such as magnesium chloride hydrate, nickel sulfate hydrate or cerous chloride hydrate, with a trialkylaluminum or a dialkyl aluminum monohalide while the former is being suspended in a medium such as benzene, toluene, ethyl ether or tetrahydrofuran.

(2) A method which comprises the action of water directly on a trialkylaluminum and/or a dialkyl aluminum monohalide in a medium such as benzene, toluene, ethyl ether or tetrahydrofuran.

Of these, the method (1) is preferably employed. The aluminoxane may contain a small amount of an organometallic component.

The catalyst of this invention may be prepared by contacting the prepared carrier-supported solid catalyst component (A) and aluminoxane catalyst component (B) in an inert medium, or by supporting the Group IVB transition metal compound and the aluminoxane simultaneously on a carrier, prior to pre-polymerization. Preferably, prior to pre-polymerization, the catalyst components (A) and (B) are mixed in an inert hydrocarbon medium. When the inert hydrocarbon medium dissolves the catalyst component (B), the resulting mixture is preferably subjected to an evaporator at room temperature or at an elevated temperature under atmospheric or reduced pressure to remove the solvent. It is alternatively preferred to deposit the catalyst component (B) by, for example, adding a solvent in which the catalyst component (B) is insoluble, thereby to form a solid catalyst at least comprising (A) and (B).

The catalyst of this invention contains the transition metal compound in an amount of usually 0.003 to 3 mg-atom, preferably 0.005 to 2 mg-atom, especially preferably 0.01 to 1 mg-atom, as the transition metal atom per gram of the carrier. The proportion of the aluminoxane catalyst component, whether prior to the pre-polymerization of an olefin, the catalyst is a solid catalyst formed from the components (A) and (B) in an inert hydrocarbon medium or a solid catalyst formed by supporting the transition metal component and the aluminoxane catalyst component, is such that the atomic ratio of aluminum atom to the transition metal atom of the transition metal compound (Al/M) is from 1 to 1000, preferably from 10 to 700, especially preferably from 15 to 500.

The catalyst of this invention may contain an electron donor in addition to the carrier component, transition metal compound and the aluminoxane. Examples of the electron donor include carboxylic acids, esters, ethers, ketones, aldehydes, alcohols, phenols, acid amides, oxygen-containing compounds such as compounds containing a metal—O—C bond (the metal is, for example, aluminum or silicon), nitriles, amines, and phosphines. The proportion of the electron donor is usually 0 to 1 mole, preferably 0.1 to 0.6 mole, per gram of the transition metal atom (M).

The solid catalyst component in this invention has an average particle diameter of usually 10 to 300 micrometers, preferably 20 to 200 micrometers, more preferably 25 to 100 micrometers and a specific surface area of usually 20 to 1000 m²/g, preferably 50 to 500 m²/g, specially preferably 100 to 300 m²/g.

The catalyst of this invention is formed by pre-polymerizing an olefin in the presence of the solid catalyst component formed from the catalyst components (A) and (B) prior to the main polymerization of an olefin. The pre-polymerization is carried out by polymerizing 0.05 to 30 g, preferably 0.1 to 20 g, more preferably 0.2 to 10 g, of the olefin per gram of the solid catalyst component formed from the catalyst components (A) and (B). Examples of the olefin are ethylene, and alpha-olefins having 3 to 20 carbon atoms such as propylene, 1-butene, 4-methyl-1-pentene, 1-hexene, 1-octene, 1-decene, 1-dodecene and 1-tetradecene. Ethylene is especially preferred.

The pre-polymerization is carried out (1) in the absence of a solvent, or (2) in an inert hydrocarbon medium. The mole ratio of the aluminum atom of the catalyst component (B) to the transition metal atom of the catalyst component (A) (Al/transition metal atom) in the pre-polymerization treatment is from 1 to 1000, preferably from 10 to 700, more preferably from 15 to 500. The pre-polymerization temperature is from −20° C. to 70° C., preferably −10° C. to 60° C., more preferably 0° C. to 50° C.

The pre-polymerization treatment may be carried out batchwise or continuously under reduced, atmospheric or elevated pressure. A molecular weight controlling agent such as hydrogen may be caused to be present in the pre-polymerization. Its amount, however, is preferably limited to those values in which a prepolymer having an intrinsic viscosity [η], measured in decalin at 135° C., of at least 0.2 dl/g, preferably 0.5 to 20 dl/g, can be produced.

By using the catalyst of this invention described above, alpha-olefins can be advantageously polymerized or copolymerized.

Investigations of the present inventors have shown that when a porous inorganic oxide treated with a compound selected from the group consisting of organometallic compounds, halogen-containing silicon compounds and aluminoxanes is used as a carrier for the solid catalyst component (A) in the catalyst component (A) and the alumilnoxane (B) before pre-polymerization treatment, the resulting catalyst shows excellent activity equivalent to the catalyst of this invention without subjecting it to pre-polymerization treatment.

Accordingly, the objects and advantages of the present invention are achieved secondly by a catalyst for polymerization of alpha-olefins, said catalyst comprising (A') a solid catalyst component composed of a compound of a transition metal of Group I of the periodic table supported on a porous inorganic oxide carrier treated with a compound selected from the group consisting of organometallic compounds, halogen-containing silicon compounds and aluminoxanes, and (B) an aluminoxane.

In the catalyst of this invention for polymerization of alpha-olefins, the porous inorganic oxide carrier is treated with a compound selected from the group consisting of organometallic compounds, halogen-containing silicon compounds and aluminoxanes.

The porous inorganic oxide carrier may be any of those which are exemplified hereinabove.

The organometallic compounds as the treating agent may be the same as those exemplified hereinabove.

In the above treatment, the mixing ratio of the organometallic compound to the carrier, as the ratio of the millimoles of the organometallic compound to the grams of the carrier, is from 0.5 to 50, preferably from 1 to 30, preferably from 1.5 to 20.

The treatment of the porous inorganic oxide carrier with the organometallic compound in the catalyst component (A') may be carried out by dispersing the carrier in an inert solvent, adding at least one organometallic compound mentioned above, and maintaining the mixture at a temperature of 0° to 120° C., preferably 10° to 100° C., more preferably 20° to 90° C., for a period of 10 minutes to 10 hours, preferably 20 minutes to 5 hours, more preferably 30 minutes to 3 hours, under atmospheric, reduced or elevated pressure.

Examples of the inert solvent are aromatic hydrocarbons such as benzene, toluene and xylene, aliphatic hydrocarbon such as pentane, hexane and isooctane, and alicyclic hydrocarbons such as cyclohexane.

The Group IVB transition metal compound is supported in a proportion of $3\times10^{-3}$ to 3 mg-atom, preferably $5\times10^{-3}$ to 2 mg-atom, more preferably $1\times10^{-2}$ to 1 mg-atom, as the transition metal atom, per gram of the porous inorganic oxide carrier treated with the organometallic compound.

The supporting of the transition metal compound may be carried out by, for example, adding the porous inorganic oxide carrier treated with the organometallic compound and the transition metal compound in an inert hydrocarbon medium, and working up the mixture in the following manner.

The treating temperature is usually 0° to 100° C., preferably 20° to 90° C., and the treating time is usually 5 minutes to 5 hours, preferably 10 minutes to 2 hours. After the supporting, the inert hydrocarbon medium is removed by filtration or evaporated under atmospheric or reduced pressure to give a solid catalyst component.

Preferably, the halogen-containing silicon compound as the treating agent is, for example, a compound represented by the following formula (IV)

$$SiY_d R_e^5 (OR^6)_{4-d-e} \qquad (IV)$$

wherein Y represents a chlorine or bromine atom, $R^5$ and $R^6$, independently from each other, represent an alkyl group having 1 to 12 carbon atoms, an aryl group, or a cycloalkyl group having 3 to 12 carbon atoms, d is a number of 1 to 4, and e is a number of 0 to 4, provided that the total of d and e is a number of 1 to 4.

Examples of this compound include silicon tetrachloride, silicon tetrabromide, silicon trichloride, methylsilicon trichloride, ethylsilicon trichloride, propylsilicon trichloride, phenylsilicon trichloride, cyclohexylsilicon trichloride, silicon tribromide, ethylsilicon tribromide, dimethylsilicon dichloride, methylsilicon dichloride, phenylsilicon dichloride, methoxysilicon trichloride, ethoxysilicon trichloride, propoxysilicone trichloride, phenoxysilicon trichloride, ethoxysilicon tribromide, methoxysilicon dichloride, methoxysilicon dichloride, and silanol trichloride. They may be used singly or in combination. Among them, silicon tetrachloride, silicon trichloride and methylsilicon trichloride are preferred.

The mixing ratio of the halogen-containing silicon compound and the porous inorganic oxide in the above treatment is such that the proportion of the halogen-containing silicon compound is 0.001 to 10 moles, preferably 0.01 to 5 moles, more preferably 0.05 to 1 mole, per gram of the carrier compound. Preferably, after the treatment, the liquid portion containing the excess of the halogen-containing silane compound, for example is removed from the reaction mixture by filtration, decantation or the like.

In the preparation of the catalyst component (A'), the treatment of the porous inorganic oxide carrier with the halogen-containing silicon compound is carried out at a temperature of −50° to 200° C., preferably 0° to 100° C., more preferably 20° to 70° C., for a period of 10 minutes to 10 hours, preferably 20 minutes to 5 hours, under atmospheric, reduced or elevated pressure.

In the above treatment, an inert solvent may be used. Examples of the inert solvent are aromatic hydrocarbons such as benzene, toluene and xylene, aliphatic hydrocarbons such as pentane, hexane, isooctane, decane and dodecane, alicyclic hydrocarbons such as cyclohexane, and halogenated hydrocarbons such as chlorobenzene and ethylene dichloride.

In the preparation of the catalyst component (A'), if the Group IVB transition metal compound to be supported on the porous inorganic oxide carrier treated with the halogen-containing silane compound in the catalyst component (A') is liquid, it is not necessary to use an inert solvent. When the transition metal compound is a normally solid substance, it is generally preferred to use an inert solvent capable of dissolving the transition metal compound.

The inert solvent that can be used at this time may be the same as those exemplified hereinabove with regard to the treatment of the porous inorganic oxide carrier. Aromatic hydrocarbons such as benzene and toluene and halogenated hydrocarbons such as chlorobenzene are especially preferred.

The amount of the transition metal compound used in the above supporting reaction is preferably 0.001 to 500 millimoles, preferably 0.01 to 100 millimoles, especcally preferably 0.1 to 50 millimoles, per gram of the porous inorganic oxide carrier treated with the halogen-containing silane compound.

The amount of the inert solvent used in the above supporting reaction is 0.5 to 1000 ml, preferably 1 to 100 ml, especially preferably 2 to 50 ml, per gram of the porous inorganic oxide carrier treated with the halogen-containng silane compound.

The above supporting reaction may be carried out by contacting and mixing the transition metal compound with the porous inorganic oxide carrier treated with the halogen-containing silane compound at a temperature of 0° to 200° C., preferably 0° to 100° C., especially 20° to 80° C., for 1 minute to 10 hours, 5 minutes to 5 hours, or 10 minutes to 3 hours.

After the supporting reaction is carried out by the above method, the liquid portion of the reaction mixture is removed by, for example, filtration or decantation, and preferably the residue is washed several times with an inert solvent.

The solid catalyst component (A') prepared by the above method contains the transition metal compound in an amount of usually 0.005 to 5 millimoles, preferably 0.01 to 1 millimole, especially preferably 0.03 to 0.3 millimole, per gram of the component (A').

Examples of the aluminoxanes as the treating agent may be the same as those exemplified above as the catalyst component (B).

In the treatment of the porous inorgnaic oxide carrier with the alumioxane, the mixing ratio of both is such that the proportion of the aluminoxane is 0.001 to 100 millimoles, preferably 0.01 to 10 millimoles, preferably 0.05 to 5 millimoles, per gram of the carrier compound. Preferably, the liquid portion containing the excess of the aluminoxane after the above treatment is removed from the reaction mixture by such a method as filtration or decantation.

The treatment of the porous inorganic oxide carrier with the aluminoxane in the preparation of the catalyst component (A') may be carried out at a temperature of −50° to 200° C., preferably 0° to 100° C., more preferably 20° to 70° C. under atmospheric, reduced or elevated pressure for a period of 10 minutes to 10 hours, preferably 20 minutes to 5 hours.

The above treatment is preferably carried out in an inert solvent. Examples of the inert solvent may include aromatic hydrocarbons such as benzene, toluene and xylene, aliphatic hydrocarbons such as pentane, hexane, isooctane, decane and dodecane, alicyclic hydrocarbons such as cyclohexane and halogenated hydrocarbons such as chlorobenzene and ethylene dichloride. Of these, the aromatic hydrocarbons are preferred.

When the Group IVB transition metal compound is liquid in depositing it on the porous inorganic oxide carrier treated with the aluminoxane, an inert solvent may or may not be used. When the transition metal compound is a normally solid substance, it is generally preferred to use an inert solvent capable of dissolving the transition metal compound.

The inert solvent that can be used at this time may be the same as those used in treating the porous inorganic oxide carrier with the aluminoxane. Aromatic hydrocarbons such as benzene and toluene and halogenated hydrocarbons such as chlorobenzene are especially preferred.

The amount of the transition metal compound used in the above supporting reaction is 0.001 to 10 millimoles, preferably 0.005 to 5 millimoles, especially preferably 0.01 to 1 millimole, per gram of the porous inorganic oxide carrier treated with the aluminoxane.

The amount of the inert solvent, the reaction temperature, the reaction time and the after-treatment used in the above supporting reaction may be the same as those described above with regard to the porous inorganic oxide carrier treated with the halogen-containing silicon compound.

The solid catalyst component (A') prepared by the above method contains the transition metal compound in an amount of usually 0.005 to 5 millimoles, preferably 0.01 to 1 millimole, especially preferably 0.03 to 0.3 millimole, per gram of the component (A').

The above catalyst of this invention comprises the solid catalyst component (A') prepared as above and the aluminoxane (B).

The catalyts of the invention described above can be used advantageously in the homopolymerization or copolymerization of alpha-olefins, and are particularly effective for the production of an ethylene polymer and a copolymer of ethylene and an alpha-olefin. Examples of the olefins that can be used in this invention are ethylene and alpha-olefins having 3 to 20 carbon atoms such as 1-butene, 1-hexene, 4-methyl-1-pentene, 1-octene, 1-decene, 1-dodecene, 1-tetradecene, 1-hexadecene, 1-octadecene and 1-eicosene.

In the process of this invention, olefin polymerization is usually carried out in the vapor phase or the liquid phase, for example in slurry. In the slurry polymerization, an inert hydrocarbon may be used as a solvent, or an olefin itself may be used as the solvent.

Specific examples of the hydrocarbon medium include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and light oil. Of these, the aliphatic hydrocarbons, alicyclic hydrocarbons and petroleum fractions are preferred.

In carrying out slurry polymerization in the process of this invention, the polymerization temperature is usually −50° to 120° C., preferably 0° to 100° C.

In carrying out the process of this invention by a slurry or vapor-phase polymerization technique, the proportion of the transition metal compound is usually $10^{-8}$ to $10^{-2}$ gram-atom/liter, preferably $10^{-7}$ to $10^{-3}$ gram-atom/liter, as the concentration of the transition metal atom in the polymerization reaction system.

In the main polymerization reaction, the aluminoxane may, or may not, be used additionally. But to obtain a polymer having excellent powder characteristics, it is preferred not to use the aluminoxane additionally.

The polymerization pressure is usually atmospheric pressure to an elevated pressure of 100 kg/cm$^2$, preferably 2 to 50 kg/cm$^2$. The polymerization may be carried out batchwise, semi-continuously or continuously.

The polymerization may also be carried out in two or more steps in which the reaction conditions are different.

When a slurry polymerization technique or a vapor-phase polymerization technique is employed in the polymerization of olefins, particularly the polymerization of ethylene or the polymerization of ethylene with an alpha-olefin, no polymer adhesion to the reactor occurs, and a polymer having excellent powder characteristics and a narrow molecular distribution can be obtained. In particular, when the catalyst of this invention is applied to the copolymerization of two or more olefins, an olefin copolymer having a narrow molecular weight distribution and a narrow composition distribution can be obtained.

EXAMPLES

The following examples specifically illustrate the process of this invention.

In Examples and Comparative Examples, MFR was measured at a temperature of 190° C. under a load of 2.16 kg. The $\overline{Mw}/\overline{Mn}$ was measured by the following procedure in accordance with "Gel Permeation Chromatography", written by Takeuchi, and published by Maruzen Co., Ltd.

(1) Using standard polystyrene having a known molecular weight (monodisperse polystyrene produced by Toyo Soda Co., Ltd.), molecular weight M and its GPC (gel permeation chromatography) count are measured, and a calibration curve of the molecular weight M and EV (elution volume) is prepared. The concentration at this time is set at 0.02% by weight.

(2) A GPC chromatograph of the sample is taken by GPC measurement. On the basis of (1) above, the number average molecular weight $\overline{Mn}$ and the weight average molecular weight $\overline{Mw}$ of the sample are calculated for polystyrene, and the $\overline{Mw}/\overline{Mn}$ is determined. The sample preparation conditions and the GPC measurement conditions are as follows:

Sample Preparation (a) The sample and o-dichlorobenzene as a solvent are taken into an Erlenmeyer flask so that the concentration of the sample is 0.1% by weight.

(b) The Erlenmeyer flask is heated at 140° C. and the mixture is stirred for about 30 minutes to dissolve the sample.

(c) A filtrate of the solution is subjected to GPC.

GPC Measurement Conditions

GPC was performed under the following conditions.
(a) Device: 150C-ALC/GPC made by Waters Co.
(b) Column: GMH type made by Toyo Soda Co., Ltd.
(c) Amount of the sample: 400 microliters
(d) Temperature: 140° C.
(e) Flow rate: 1 ml/min.

The amount of an n-decane-soluble portion of the copolymer (as the amount of the soluble portion is smaller, the composition distribution of the copolymer is narrower) is measured by adding about 3 g of the copolymer to 450 ml of n-decane, dissolving it at 145° C., gradually cooling the solution to 23° C., removing the n-decane-insoluble portion by filtration, and recovering the n-decane-soluble portion from the filtrate.

Example 1

Preparation of Aluminoxane

A 400 ml fully nitrogen-purged flask was charged with 37 g of $Al_2(SO_4)_3 \cdot 14H_2O$ and 125 ml of toluene. The flask was cooled to 0° C., and 500 millimoles of trimethylaluminum diluted with 125 ml of toluene. The mixture was then heated to 40° C., and reacted at this temperature for 10 hours. After the reaction, the reaction mixture was subjected to solid-liquid separation by filtration. The toluene was removed from the filtrate to give 13 g of aluminoxane as a white solid. The molecular weight of the product, determined by freezing point depression in benzene, was 930. It had an average degree of polymerization of 16.

Preparation of a Zirconium Catalyst 2.3 g of calcined silica obtained by calcining silica (average particle diameter 70 μm, specific surface area 260 $m^2/g$, pore volume 1.65 $cm^3/g$) at 300° C. for 4 hours, 15 ml of a toluene solution (aluminum 1 mole/liter) of dimethyl aluminum monochloride and 50 ml of toluene were introduced into a 200 ml flask purged fully with nitrogen, and heated at 80° C. for 2 hours. The reaction mixture was subjected to solid-liquid separation by filtration. The solid portion was transferred into 50 ml of toluene, and 6.4 ml of a toluene solution (Zr 0.01 mole/liter) of biscyclopentadienyl zirconium chloride was added. The mixture was stirred at room temperature for 2 hours. Then, 31 ml of a toluene solution (Al 1.03 moles/liter) of aluminoxane as catalyst component (B) was added, and the mixture was stirred at room temperature for 30 minutes. Subsequently, toluene was removed from the solution at room temperature by means of an evaporator to give a solid catalyst component containing 0.14% by weight of Zr and 22% by weight of Al. The solid catalyst component had an average particle diameter of 83 μm, and a specific surface area of 207 $m^2/g$.

Preliminary Polymerization

A gaseous mixture of ethylene and nitrogen (20 liters/hr and 30 liters/hr, respectively) was passed through the solid catalyst component prepared as above for 30 minutes at room temperature to pre-polymerize ethylene. Ethylene polymerized in an amount of 0.62 g per gram of the solid catalyst component.

Main Polymerization

One liter of hexane was introduced into a 2-liter stainless steel autoclave fully purged with nitrogen, and the temperature was raised to 45° C. Then, the solid catalyst component subjected to the preliminary polymerization was charged into the autoclave in an amount of 0.015 milligram-atom calculated as the zirconium atoms, and the temperature was raised to 60° C. Subsequently, ethylene was introduced and the total pressure was set at 6 $kg/cm^2$-G. Its polymerization was started, and then continued at 70° C. for 2 hours while maintaining the total pressure at 6 $kg/cm^2$-G by supplying ethylene alone. After the polymerization, the polymer slurry was separated by filtration, and dried overnight at 80° C. under reduced pressure. There was obtained 85.9 g of a polymer having an MFR of 0.03 g/10 min., an $\overline{Mw}/\overline{Mn}$ of 2.65 and a bulk density of 0.36 $g/cm^3$. No adhesion of the polymer to the wall of the autoclave was observed.

Example 2

Preparation of a zirconium catalyst 2.3 g of calcined silica obtained by calcining silica (average particle diameter 70 μm, specific surface area 260 $m^2/g$, pore volume 1.65 $cm^3/g$) at 300° C. for 4 hours, 4.8 ml of a toluene solution (Zr 0.01 mole/liter) of biscyclopentadienyl zirconium dichloride and 30 ml of a toluene solution (Al 1.03 mole/liter) of the aluminoxane synthesized in Example 1 were introduced into a 200 ml fully nitrogen-purged flask. The mixture was stirred at room temperature for 30 minutes. Subsequently, the toluene was removed from the solution at room temperature by an evaporator to give a solid catalyst component containing 0.11% by weight of Zr and 20% by weight of Al. The solid catalyst component had an average particle diameter of 78 μm and a specific surface area of 210 $m^2/g$.

Preliminary Polymerization

A gaseous mixture of ethylene and nitrogen (20 liters/hr and 30 liters/hr respectively) was passed at room temperature for 30 minutes through the solid catalyst component obtained as above to pre-polymerize ethylene. Ethylene polymerized in an amount of 0.51 g per gram of the solid catalyst component.

Main Polymerization

The same polymerization as in Example 1 was carried out to give 102.5 g of a polymer having an MFR of 0.05 g/10 min., an $\overline{Mw}/\overline{Mn}$ of 2.73 and a bulk density of 0.35 $g/cm^3$. No adhesion of the polymer to the autoclave wall was observed.

Example 3

Preparation of a Zirconium Catalyst

A solid catalyst component containing 0.22% by weight of Zr and 21% by weight of Al was obtained by repeating Example 2 except that 1.9 g of silica, 8.0 ml of a toluene solution (Zr 0.01 mole/liter) of biscyclopentadienyl zirconium dicloride and 25 ml of a toluene solution (Al 1.03 mole/liter) of aluminoxane synthesized in Example 1 were used. The resulting solid catalyst component had an average particle diameter of 78 μm and a specific surface area of 220 $m^2/g$.

Preliminary Polymerization

Prepolymerization was carried out in the same way as in Example 1 to give a solid catalyst which catalyzed polymerization of 0.49 g of ethylene per gram thereof.

Main Polymerization

Example 1 was repeated to give 26.3 g of a polymer having an MFR of 0.02 g/10 min., an $\overline{Mw}/\overline{Mn}$ of 2.80 and a bulk density of 0.37 $g/cm^3$. No adhesion of the polymer to the wall of the autoclave was observed.

Example 4

Preparation of a Zirconium Catalyst

5.8 g of calcined alumina obtained by calcining alumina (average particle diameter 60 μm, specific surface area 290 $m^2/g$, pore volume 1.05 ml/g) at 500° C. for 5 hours, 17 ml of a toluene solution (Al 1 mole/liter) of dimethylaluminum monochloride and 50 ml of toluene were introduced into a 200 ml flask fully purged with nitrogen, and heated at 80° C. for 2 hours. Then, the reaction mixture was subjected to solid-liquid separation by filtration, and the solid portion was transferred into 50 ml of toluene. Furthermore, 32 ml of a toluene solution (Zr 0.036 mole/liter) of biscyclopentadienyl zirconium chloride was added, and the mixture was heated at 80° C. for 1 hour. The reaction mixture was subjected to solid-liquid separation by filtration to give a solid catalyst containing 0.25% by weight of Zr. The above solid portion had an average particle diameter of 69 μm and a specific surface area of 240 $m^2/g$.

Preliminary Polymerization

The solid catalyst obtained as above (0.015 mg-atom as Zr), 4.9 ml of a toluene solution (Al 1.03 mole/liter) of the aluminoxane synthesized in Example 1 and 20 ml of toluene were stirred at room temperature for 30 minutes, and then toluene was removed at room temperature by an evaporator.

The resulting solid catalyst was subjected to preliminary polymerization in the same way as in Example 1. Ethylene polymerized in an amount of 0.32 g per gram of the solid catalyst.

Main Polymerization

Sodium chloride (special reagent grade, Wako Pure Chemicals, Co., Ltd.; 250 g) was introduced into a 2-liter stainless steel autoclave fully purged with nitrogen, and dried at 90° C. under reduced presure for 1 hour. Thereafter, the inside of the autoclave was purged with ethylene, and the temperature was raised to 75° C. Subsequently, all the catalyst subjected to preliminary polymerization was charged into the autoclave, and ethyene was introduced. The total pressure was adjusted to 8 $kg/cm^2$-G, and the polymerization of ethylene was started. Thereafter, the polymerization was carried out at 80° C. for 1 hour while maintaining the total pressure at 8 $kg/cm^2$-G by supplying ethylene alone. After the polymerization, sodium chloride was removed by washing with water, and the remaining polymer was washed with hexane and then dried overnight at 80° C. under reduced pressure. There was obtained 32.2 g of a polymer having an MFR of 0.10 g/10 min., an $\overline{Mw}/\overline{Mn}$ of 2.79 and a bulk density of 0.40 $g/cm^3$. No adhesion of the polymer to the wall of the autoclave was observed.

Example 5

Main Polymerization

Ethylene and 1-hexene were copolymerized under a total pressure of 7 $kg/cm^2$-G using 900 ml of hexane and 100 ml of 1-hexene. Otherwise, Example 1 was repeated to give 110 g of a polymer having an MFR of 0.12 g/10 min., an $\overline{Mw}/\overline{Mn}$ of 2.80, a bulk density of 0.34 $g/cm^3$, a density of 0.915 $g/cm^3$ and a weight fraction of a portion soluble in decane at room temperature of 0.25% by weight. Hardly any adhesion of the polymer to the wall of the autoclave was observed.

Comparative Example 1

The catalyst preparation and polymerization were carried out in the same way as in Example 2 except that the preliminary polymerization was not carried out. There was obtained 95.9 g of a polymer having an MFR of 0.002 g/10 min., an $\overline{Mw}/\overline{Mn}$ of 2.91 and a bulk density of 0.07 $g/cm^3$. Considerable adhesion of the polymer to the wall of the autoclave was observed.

Example 6

Preparation of a Zirconium Catalyst

2.3 g of calcined silica obtained by calcining silica (average particle diameter 70 μm, specific surface area 260 $m^2/g$, pore volume 1.65 $cm^3/g$) at 300° C. for 4 hours, 15 ml of a toluene solution (Al 1 mole/liter) of dimethylaluminum monochloride, and 50 ml of toluene were introduced into a 200 ml fully nitrogen-purged flask, and heated at 80° C. for 2 hours. Subsequently, the reaction mixture was subjected to solid-liquid separation by filtration, and the solid portion was transferred into 50 ml of toluene. Then, 6.4 ml of a toluene solution (0.01 mole-Zr/liter of solution) of bis (cyclopentadienyl)zirconium dichloride was added. The mixture was stirred at room temperature for 2 hours and then subjected to solid-liquid separation by filtration. The solid portion was suspended in 100 ml of n-decane. While the suspension was stirred, 31 ml of a toluene solution (2.3 moles-Al/liter of solution) of aluminoxane was added. The mixture was warmed to 35° C., and the pressure of the inside of the reactor was reduced to 4 torr to evaporate the toluene. The reaction suspension was filtered at −20° C. The solid portion was collected and suspended in 50 ml of n-decane. The resulting solid catalyst had an average particle diameter of 78 μm and a specific surface area of 226 $m^2/g$.

Preliminary Polymerization

A 400 ml reactor equipped with a stirrer was charged with 100 ml of purified n-decane and 0.1 mg-atom, as Zr, of the above solid catalyst in an atmosphere of nitrogen, and then ethylene was fed into the reactor for 1 hour at a rate of 4N l/hour. During this time, the temperature was maintained at 20° C. After the feeding of ethylene, the inside of the reactor was purged with nitrogen, and the reaction mixture was washed once with purified hexane, and suspended in hexane. The catalyst was thus stored in a catalyst bottle.

Main Polymerization

Sodium chloride as a dispersant was added in an amount of 250 $g/cm^3$ to a 2-liter autoclave purged fully with nitrogen, and while the autoclave was heated at 90° C., pressure reduction treatment was carried out for 2 hours using a vacuum pump so that the pressure of the inside of the autoclave was below 50 mmHg. Then, the temperature of the autoclave was lowered to 75° C., and the inside of the autoclave was purged with ethylene. The solid catalyst component subjected to prepolymerization was added in an amount of 0.007 millimole as Zr, and the autoclave was sealed up. Hydrogen (50N ml) was added, and ethylene was introduced so that the inside pressure of the autoclave reached 8.0 kg/cm$^2$-G. The stirring speed was raised to 300 rpm, and the polymerization was carried out at 80° C. for 1 hour.

After the polymerization, all the polymer and sodium chloride in the autoclave were taken out and fed into about 1 liter of water. By stirring for about 5 minutes, almost all sodium chloride dissolved in water and only the polymer came afloat on the water surface. The floating polymer was recovered, washed thoroughly with methanol, and dried overnight at 80° C. under reduced pressure. The amount of the polymer yielded was 106.2 g/cm$^3$. It had an MFR of 2.1 dg/min. and an apparent bulk density of 0.46 g/ml. The amount of a fine powdery polymer having a particle size of less than 105 μm was 0.1% by weight of the total amount of the polymerization product. On the other hand, no coarse polymer having a size of more than 1120 μm was seen to form. The $\overline{Mw}/\overline{Mn}$, determined by GPC measurement, was 3.0.

Comparative Example 2

Catalyst preparation and polymerization were carried out in the same way as in Example 6 except that no preliminary polymerization as in Example 6 was carried out. There was obtained 63.3 g of a polymer having an MFR of 3.6 dg/min. and an apparent density of 0.28 g/ml. The amount of a fine powdery polymer having a size of less than 105 μm was 7.6% by weight based on the total amount of the polymerization product.

Example 7

Preparation of a Zirconium Catalyst 67 ml of a toluene solution containing 100 millimoles, as the Al atoms, of the aluminoxane and 2 g of a polyethylene powder having an average particle diameter of 35 μm (MIPERON®, a trademark for a product of Mitsui Petrochemical Industries, Ltd.) were charged into a 300 ml pressure-reducible reactor equipped with a stirrer, and with stirring at room temperature, 100 ml of purified n-decane was added over the course of about 0.5 hour, whereupon the aluminoxane was precipitated. Then, the temperature of the inside of the reactor was raised to 35° C. over the course of about 3 hours while the pressure of the inside of the reactor was reduced to 4 torr by means of a vacuum pump. Consequently, the toluene in the reactor was removed, and the aluminoxane was further precipitated. The reaction solution was filtered by a filter, and the liquid portion was removed. The solid portion was suspended in n-decane, and 5 ml of a toluene solution containing 0.2 millimole of bis(cyclopentadienyl)zirconium chloride was added. They were mixed at room temperature for about 1 hour, and the liquid portion was removed by a filter. Thus, a solid catalyst for olefin polymerization was formed.

The Zr content of the resulting solid catalyst was 9 millimoles per 100 g of the polyethylene used as a carrier, and its Al content was 2.0 moles per 100 g of the polyethylene carrier. The average catalyst particle diameter of the catalyst determiend by microscopic observation was about 40 μm, and it had a specific surface area of 143 m$^2$/g. Prepolymerization and vapor-phase polymerization of ethylene were carried out by the same operations as in Example 6. There was obtained 128.2 g of a polymer having an MFR of 1.6 dg/min. and an apparent bulk density of 0.46 g/ml. The amount of a fine powdery polymer having a particle diameter of less than 105 μm was 0.1% by weight based on the total amount of the polymerization product. The $\overline{Mw}/\overline{Mn}$ determined by GPC measurement was 2.6.

Example 8

A solid catalyst was prepared in the same way as in Example 7 except that 2 liters of spherical polystyrene particles having a particle diameter of about 30 μm (#200 to #400, a product of Eastman Kodak Co.) was used instead of the polyethylene carrier. Preliminary polymerization and vapor-phase polymerizaton of ethylene were carried out as in Example 7. The resulting solid catalyst had an average particle diameter of 35 μm and a specific surface area of 143 m$^2$/g. As a result, there was obtained 110.6 g of a polymer having an MFR of 3.6 dg/min. and an apparent bulk density of 0.44 g/ml. The amount of a fine powdery polymer having a particle diameter of less than 105 μm was 0.2% by weight based on the total amount of the polymerization product.

Example 9

Preparation of a Solid Catalyst Component (Zirconium Catalyst)

5.2 g of calcined silica obtained by calcining silica (average particle diameter 70 μm, specific surface area 260 m$^2$/g pore volume 1.65 cm$^3$/g) at 700° C. for 5 hours, 26 ml of a toluene solution (Al 1 mole/liter) of diethylaluminum monochloride and 50 ml of toluene were introduced into a 200 ml flask fully purged with nitrogen, and heated at 80° C. for 2 hours. The reaction mixture was then subjected to solid-liquid separation by filtration to obtain a catalyst component. The catalyst component was transferred into 50 ml of toluene, and 43 ml of a toluene solution (Zr 0.04 mole/liter) of bis(cyclopentadienyl)zirconium chloride as another catalyst component was added, and the mixture was heated at 80° C. for 1 hour. The reaction mixture was subjected to solid-liquid separation by filtration to obtain a solid catalyst component (A') having 0.012 mg-atom and 1.12 mg-atom of Al supported per gram of silica. The solid catalyst component (A') in an amount of 0.015 mg-atom, as Zr, was added to 4.9 ml of a toluene solution (Al 1.03 moles/liter) of aluminoxane as catalyst component (B) and 20 ml of toluene, and the mixture was stirred at room temperature for 30 minutes. Then, the toluene was removed from the mixture by an evaporator to give a solid catalyst component containing 0.08% by weight of Zr and 10% by weight of Al.

Polymerization 250 g of sodium chloride (special reagent grade, Wako Pure Chemical Co., Ltd.) was introduced into a 2-liter stainless steel autoclave fully purged with nitrogen, and dried at 90° C. for 1 hour under reduced presure. Thereafter, the inside of the autoclave was purged with ethylene, and the temperature was adjusted to 75° C. Subsequently, all the catalyst prepared as above was introduced. Ethylene was introduced, and under a total pressure of 8 kg/cm$^2$-G, its polymerization was started. Thereafter, only ethylene was supplied, and the polymerization was carried out at 80° C. for 1 hour while the total pressure was maintained at 8 kg/cm$^2$-G. After the polymerization, sodium chloride was removed by washing with water. The remaining polymer was washed with hexane, and dried overnight at 80° C. under reduced pressure. There was obtained 72 g of a polymer having an MFR of 0.07 g/10 min., an $\overline{Mw}/\overline{Mn}$ of 2.64 and a bulk density of 0.36 g/cm³. No adhesion of the polymer to the wall of the autoclave was observed.

Example 10

Preparation of a Solid Catalyst Component (Zirconium Catalyst)

5.8 g of calcined alumina obtained by calcining alumina (average particle diameter 60 μm, specific surface area 270 m²/g, pore volume 1.05 cm³/g) at 500° C. for 5 hours, 17 ml of a toluene solution (Al 1 mole/liter) of dimethylaluminum monochloride and 50 ml of toluene were added to a 200 ml flask purged fully with nitrogen, and the mixture was heated at 80° C. for 2 hours. The reaction mixture was then subjected to solid-liquid separation by filtration. The solid portion was transferred into 50 ml of toluene, and 32 ml of a toluene solution (Zr 0.036 mole/liter) of bis (cyclopentadienyl)zirconium chloride was added. The mixture was heated at 80° C. for 1 hour. The reaction mixture was subjected to solid-liquid separation by filtration to obtain a solid component containing 0.25% by weight of Zr. This solid component was reacted with aluminoxane in the same way as in Example 9 to give a solid catalyst component containing 0.16% by weight of Zr.

Polymerization

The same polymerization as in Example 9 was carried out using 0.015 mg-atom, as Zr atom, of the above solid catalyst. There was obtained 42 g of a polymer having an MFR of 0.09 g/10 min., an $\overline{Mw}/\overline{Mn}$ of 2.77 and a bulk density of 0.35 g/cm³. No adhesion of the polymer to the wall of the autoclave was observed.

Example 11

Preparation of a Solid Catalyst Component (Zirconium Catalyst)

2.3 g of calcined silica obtained by calcining silica (average particle diameter 70 μm, specific surface area 260 m²/g, pore volume 1.65 cm³/g) at 300° C. for 4 hours, 15 ml of a toluene solution (Al 1 mole/liter) of dimethylaluminum monochloride and 50 ml of toluene were introduced into a 200 ml flask purged with nitrogen, and heated at 80° C. for 2 hours. The reaction mixture was subjected to solid-liquid separation by filtration. The solid portion was transferred into 50 ml of toluene, and 6.4 ml of a toluene solution (Zr 0.01 mole/liter) of bis(cyclopentadienyl)zirconium chloride was added. The mixture was stirred at room temperature for 2 hours. Then, 31 ml of a toluene solution (Al 1.03 mole/liter) of the aluminoxane synthesized in Example 9 was added, and the mixture was stirred at room temperature for 30 minutes. The reaction mixture was worked up as in Example 9 to give a solid titanium component containing 0.14% by weight of Zr and 22% by weight of Al.

Polymerization

The same polymerization as in Example 9 was carried out using 0.015 mg-atom, as Zr, of the above solid catalyst. There was obtained 70 g of a polymer having an MFR of 0.12 g/10 min., an $\overline{Mw}/\overline{Mn}$ of 2.67, and a bulk density of 0.38 g/cm³. No adhesion of the polymer to the wall of the autoclave was noted.

Comparative Example 3

Catalyst preparation and polymerization were carried out in the same way as in Example 9 except that silica was not treated with dimethylaluminum monochloride. There was obtained 21 g of a polymer having an MFR of 0.02 g/10 min., an $\overline{Mw}/\overline{Mn}$ of 2.89 and a bulk density of 0.15 g/cm³.

The solid catalyst component used in the polymerization contained 0.35% by weight of Zr and 35% by weight of Al.

Example 12

Preparation of a Solid Catalyst Component (Zirconium Catalyst)

Example 9 was repeated except that 6 millimoles of triethyl aluminum instead of dimethyl aluminum monochloride was added to 1 g of silica calcined at 800° C. for 12 hours and reacted at 50° C. for 2 hours, and that 0.042 millimole of biscyclopentadienyl zirconium dichloride per gram of silica was added and reacted at room temperature for 2 hours. There was obtained a solid catalyst component having 6.7×10⁻³ milligram-atom of zirconium supported per gram of silica.

Polymerization

Polymerization was carried out in the same way as in Example 9 except that 15 milligram-atom, as aluminum atom, of aluminoxane, and 0.015 milligram-atom, as zirconium atom, of the solid catalyst component prepared above were introduced, and furthermore, 50 ml of hydrogen was added. There was obtained 69 g of a polymer having an MFR of 24 g/10 min., an $\overline{Mw}/\overline{Mn}$ of 2.70 and a bulk density of 0.31 g/cm³.

Adhesion of the polymer to the autoclave wall was hardly observed.

Example 13

Preparation of a Solid Catalyst Component (Zr Catalyst)

Example 12 was repeated except that diethyl aluminum monochloride was used instead of triethyl aluminum. A solid catalyst component having 5.7×10⁻³ milligram-atom of zirconium supported on it per gram of silica was obtained.

Polymerization

Polymerization was carried out as in Example 12 to give 71 g of a polymer having an MFR of 9.5 g/10 min., an $\overline{Mw}/\overline{Mn}$ of 2.59 and a bulk density of 0.34 g/cm³. Adhesion of the polymer to the autoclave wall was hardly observed.

Example 14

Polymerization

Example 9 was repeated except that 10 ml of hexene-1 was added, and the polymerization was carried out at 70° C. for 0.5 hour. There was obtained 42 g of a polymer having an MRF of 2.05 g/10 min., an $\overline{Mw}/\overline{Mn}$ of 2.84, a bulk density of 0.31 g/cm³, a density of 0.926 g/cm³ and a weight fraction of a decane-soluble portion of 0.15% by weight.

Adhesion of the polymer to the autoclave wall was hardly observed.

Example 15

Preparation of a Solid Catalyst Component [A]

In a 400 ml glass flask equipped with a stirrer and fully purged with nitrogen, a mixed suspension composed of 3 g of silica (#952 made by Davison Co.) calcined for 12 hours at 300° C. and 50 ml of trichlorosilane was reacted at 50° C. for 2 hours with stirring. After the reaction, the liquid portion was removed from the reaction mixture by using a filter, and the remaining solid portion was suspended in 50 ml of toluene. To the suspension was added 300 ml of toluene containing 15 millimoles of bis(cyclopentadienyl)zirconium dichloride at 25° C. The mixture was reacted at 50° C. for 2 hours with stirring. After the reaction, the liquid portion was removed from the suspension by using a filter. The remaining solid portion was washed twice with toluene to give a solid catalyst component (A). The amount of zirconium supported on the catalyst component (A) was 1.4% by weight.

Polymerization

Sodium chloride (250 g) as a dispersant was added to a 2-liter autoclave fully purged with nitrogen. While the autoclave was heated to 90° C., the inside of the autoclave was subjected to a pressure reduction treatment for 2 hours using a vacuum pump so that the inside pressure of the autoclave became 50 mmHg or below. The temperature of the autoclave was then lowered to 75° C., and the inside of the autoclave was replaced by ethylene. Then, 0.13 millimole of aluminoxane was added, and the mixture was stirred for 2 minutes at a rotating speed of 50 rpm. Thereafter, 0.87 millimole of aluminoxane and 0.015 millimole, as zirconium atom, of the solid catalyst component were added, and the autoclave was sealed up. Hydrogen (20N ml) was added and the autoclave was pressurized with ethylene so that the pressure of the inside of the autoclave reached 8 kg/cm$^2$-G. The stirring speed was increased to 300 rpm, and the polymerization was carried out at 80° C. for 1 hour.

After the polymerization, all the polymer and sodium chloride in the autoclave were taken out and put in about 1 liter of water. The mixture was stirred for about 5 minutes to dissolve almost all sodium chloride in water. As a result, only the polymer came afloat on the water surface. The floating polymer was recovered, fully washed with methanol, and dried overnight at 80° C. under reduced pressure. The amount of the polymer yielded was 48.3 g, and the polymer had an MFR of 13 and an apparent bulk density of 0.42 g/ml. A fine powdery polymer having a size of not more than 105 micrometers and a coarse polymer having a size of at least 1120 micrometers were not observed. The polymer had an $\overline{Mw}/\overline{Mn}$ of 2.7.

Examples 16 to 19

Ethylene was polymerized in the same way as in Example 15 except that each of the silane compounds indicated in Table 1 was used instead of the trichlorosilane used in preparing the solid catalyst component in Example 15. The results are shown in Table 1.

Example 20

A solid catalyst component was prepared, and ethylene was polymerized, as in Example 15 except that the amount of trichlorosilane used to treat silica was changed from 50 ml to 10 ml in the preparation of the solid catalyst component in Example 15. The results are shown in Table 2.

Example 21

A solid catalyst component was prepared, and ethylene was polymerized, as in Example 20 except that the amount of bis(cyclopentadienyl)zirconium dichloride used in the preparation of the solid catalyst component in Example 20 was changed from 15 millimoles to 3 millimoles, and the amount of toluene at this time was changed from 300 ml to 60 ml. The results are shown in Table 2.

Example 22

Ethylene was polymerized as in Example 15 except that chlorinated aluminoxane was used instead of the aluminoxane used at the time of polymerization in Example 15. The results are shown in Table 2. The chlorinated aluminoxane was prepared by the following method.

Aluminoxane-III

This compound was synthesized as in the synthesis of aluminoxane-I except that in the synthesis of aluminoxane-I, the amount of trimethyl aluminum was changed from 50 ml to 24.7 ml and 25.3 ml of dimethyl aluminum chloride was simultaneously added dropwise. The aluminoxane had an average degree of polymerization of 12.

Example 23

Polymerization was carried out in the same way as in Example 15 except that in Example 15, a gaseous mixture of butene-1 and ethylene containing 9.5 mole % of butene-1 was used instead of ethylene alone, and the polymerization temperature was changed from 80° C. to 70° C. The results are shown in Table 3.

Comparative Example 4

An MgCl$_2$-supported Ti catalyst component prepared in accordance with the method of Example 1 of Japanese Laid-Open Patent Publication No. 811/1981 was used. Polymerization was carried out in the same way as in Example 15 except that aluminoxane described under the heading Polymerization in Example 15 was replaced by triethyl aluminum, and the same gaseous mixture of butene-1 and ethylene containing 9.5 mole % of butene-1 as used in Example 23 was used, and the polymerization temperature was changed from 80° C. to 70° C. The results are shown in Table 3.

TABLE 1

| Example | Si Compound | Amount of Zr supported (wt. %) | Polymerization activity (g-PE/mM-Ti) | Bulk density (g/ml) | Particle size distribution (wt. %) | |
|---|---|---|---|---|---|---|
| | | | | | 105 μm and below | 1120 μm and above |
| 15 | HSiCl$_3$ | 1.2 | 3,200 | 0.42 | 0 | 0 |
| 16 | SiCl$_4$ | 1.3 | 3,100 | 0.42 | 0.1 | 0 |
| 17 | HMeSiCl$_2$ | 0.9 | 2,700 | 0.40 | 0.1 | 0 |
| 18 | HPhSiCl$_2$ | 0.7 | 2,000 | 0.39 | 0.1 | 0.1 |
| 19 | MeSiCl$_2$ | 1.4 | 2,600 | 0.39 | 0 | 0 |

TABLE 2

| Example | Amount of Zr supported (wt. %) | Polymerization activity (g-PE/mM-Ti) | Bulk density (g/ml) | Particle size distribution (wt. %) 105 μm and below | 1120 μm and above |
|---|---|---|---|---|---|
| 20 | 1.0 | 3,000 | 0.42 | 0 | 0 |
| 21 | 3.0 | 4,300 | 0.41 | 0.1 | 0 |
| 22 | — | 2,100 | 0.41 | 0.2 | 0 |

TABLE 3

| Run | Polymerization activity (g-PE/mM-Metal) | MFR (dg/min) | Bulk density (g/ml) | Density (g/ml) | Amount of the decane-soluble component (wt. %) | $\bar{M}w/\bar{M}n$ |
|---|---|---|---|---|---|---|
| Example 23 | 3,300 | 11.0 | 0.38 | 0.919 | 3.0 | 2.7 |
| Comparative Example 4 | 5,200 | 3.0 | 0.30 | 0.918 | 6.4 | 4.7 |

Example 24

Synthesis of Aluminoxane
Aluminoxane-I:

$Al_2(SO_4)_3 \cdot 14H_2O$ (37 g) and 125 ml of toluene were put in a 400 ml glass flask equipped with a stirrer and purged fully with nitrogen, and cooled to 0° C. Then, 125 ml of toluene containing 50 ml of trimethyl aluminum was added dropwise over 1 hour. The mixture was heated to 40° C. over 2 hours and the reaction was continued at this temperature for 10 hours. After the reaction, the reaction mixture was subjected to solid-liquid separation by filtration. Low-boiling materials were removed from the separated liquid by means of an evaporator. Toluene was added to the remaining viscous liquid and the toluene solution was collected. The resulting aluminoxane had a molecular weight, determined from its freezing point depression in benzene, of 885 and an average degree of polymerization of 15.

Aluminoxane-II:

The synthesis of aluminoxane-I was repeated except that the reaction time at 40° C. was changed from 10 hours to 2 hours. The resulting aluminoxane had a degree of polymerization of 6.

Preparation of a Solid Catalyst Component (Zr Catalyst)

In a 400 ml glass flask equipped with a stirrer and purged fully with nitrogen, a solution of 2 millimoles of aluminoxane (I) in 50 ml of toluene was added at room temperature to a suspension composed of 5 g of silica (#952 produced by Davison Co.) calcined at 800° C. for 12 hours and 100 ml of toluene. The mixture was heated to 50° C. and reacted at 50° C. for 2 hours. After the reaction, the liquid portion was removed from the reaction mixture by using a filter. The remaining solid portion was suspended in 100 ml of toluene. To the suspension was added 9.4 ml of toluene containing 0.38 millimole of bis(cyclopentadienyl)zirconium dichloride at 25° C., and the mixture was reacted at 25° C. for 2 hours. After the reaction, the liquid portion was removed from the suspension by using a filter. The remaining solid portion was washed twice with toluene to give a solid catalyst component. The catalyst component had 0.6% by weight of zirconium supported on it.

Polymerization

Sodium chloride (250 g) as a dispersing agent was added to a 2-liter autoclave purged fully with nitrogen, and while the autoclave was heated at 90° C., it was subjected to a pressure reduction treatment for 2 hours by means of a vacuum pump so that the inside pressure of the autoclave became 50 mmHg or below. The temperature of the autocalve was then lowered to 75° C., and the inside of the autoclave was replaced by ethylene. 0.13 millimole of aluminoxane (aluminoxane-II) was then added, and the mixture was stirred at a speed of 50 rpm for 2 minutes. Thereafter, 0.87 millimole of aluminoxane (aluminoxane-I) and 0.015 millimole, as zirconium atom, of the solid catalyst component were added. The autoclave was sealed up. Hydrogen (20N ml) was added and the inside of the autoclave was pressurized with ethylene so that the inside pressure became 8 kg/cm$^2$-G. The stirring speed was increased to 300 rpm, and the polymerization was carried out at 80° C. for 1 hour.

After the polymerization, all the polymer and sodium chloride in the autoclave were taken out, and put in about 1 liter of water. The mixture was stirred for about 5 minutes to dissolve almost all the sodium chloride. Only the polymer came afloat on the water surface. The floating polymer was recovered, washed fully with methanol, and dried overnight at 80° C. under reduced pressure. The amount of the polymer yielded was 82.1 g. The polymer had an MFR of 7.9 and an apparent bulk density of 0.43 g/ml. The amount of a fine powdery polymer having a size of not more than 105 micrometers was 0.1% by weight of the entire polymerization product. A coarse polymer having a size of at least 1120 micrometers was not observed. The $\bar{M}w/\bar{M}n$ of the polymer was 2.7. The results are shown in Table 4.

Example 25

A solid catalyst component was prepared, and ethylene was polymerized, in the same way as in Example 24 except that in the preparation of the solid catalyst component in Example 24, the amount of aluminoxane used to treat silica was changed from 2 millimoles to 10 millimoles. The results are shown in Table 4.

Examples 26 and 27

A solid catalyst component (A) was prepared, and ethylene was polymerized, in the same way as in Example 24 except that in the preparation of the solid catalyst component in Example 24, the temperature at which the reaction of supporting cyclopentadienyl zirconium dichloride was carried out in the preparation of the solid catalyst component in Example 24 was changed to 50° and 80° C. respectively from 25° C. The results are shown in Table 4.

Example 28

A solid catalyst component was prepared, and ethylene was polymerized, in the same way as in Example 24 except that in the preparation of the solid catalyst component in Example 24, aluminoxane-II was used instead of the aluminoxane-I. The results are shown in Table 4.

Example 29

Ethylene was polymerized in the same way as in Example 24 except that aluminoxane-II was used instead of the aluminoxane-I at the time of polymerization in Example 24. The results are shown in Table 4.

Example 30

Polymerization was carried out in the same way as in Example 24 except that a gaseous mixture of butene-1 and ethylene containing 9.5 mole % of butene-1 was used instead of ethylene, and the polymerization temperature was changed from 80° C. to 70° C. The results are shown in Table 5.

TABLE 4

| Example | Polymerization activity (g-PE/ mM-Zr) | MFR (dg/min) | Apparent bulk density (g/ml) | Particle size distribution (wt. %) | |
|---|---|---|---|---|---|
| | | | | 105 μm and below | 1120 μm and above |
| 24 | 5,500 | 7.9 | 0.43 | 0.1 | 0 |
| 25 | 4,800 | 12 | 0.43 | 0.1 | 0 |
| 26 | 5,400 | 13 | 0.42 | 0.1 | 0.1 |
| 27 | 5,000 | 17 | 0.43 | 0.1 | 0 |
| 28 | 4,900 | 6.1 | 0.43 | 0 | 0 |
| 29 | 3,800 | 8.3 | 0.42 | 0.1 | 0 |

TABLE 5

| Example | Polymerization activity (g-PE/mM-Metal) | MFR (dg/min) | Apparent bulk density (g/ml) | Density (g/ml) | Amount of the decane-soluble portion (wt. %) | Mw/Mn |
|---|---|---|---|---|---|---|
| 30 | 4,900 | 21 | 0.39 | 0.916 | 2.6 | 2.6 |

Example 31

Synthesis of Aluminoxane
Halogenated Aluminoxane-I:

This compound was synthesized by the same method as in the synthesis of aluminoxane-I except that in the synthesis of aluminoxane-I, 46 ml of dimethyl aluminum chloride was used instead of 50 ml of trimethyl aluminum. The resulting halogenated aluminoxane had an average degree of polymerization of 11.

Halogenated Aluminoxane-II:

This compound was synthesized in the same way as in the synthesis of aluminoxane-I except that in the synthesis of aluminoxane-I, the amount of trimethyl aluminum added was changed from 50 ml to 24.7 ml and 25.3 ml of dimethyl aluminum chloride was added dropwise at the same time. This halogenated aluminoxane had a degree of polymerization of 12.

Preparation of a Solid Catalyst Component (Zr Catalyst)

In a 400 ml glass flask equipped with a stirrer and purged fully with nitrogen, 50 ml of toluene solution containing 2 millimoles of halogenated aluminoxane-I was added to a suspension composed of 5 g of silica (#952 produced by Davison Co.) calcined at 800° C. for 12 hours and 100 ml of toluene. The mixture was heated to 50° C. and reacted at 50° C. for 2 hours. After the reaction, the liquid portion was removed from the reaction mixture by using a filter. The remaining solid portion was suspended in 100 ml of toluene. To the suspension was added 9.4 ml of toluene containing 0.38 millimole of bis(cyclopentadienyl)zirconium dichloride at 25° C., and the reaction was carried out at 25° C. for 2 hours. After the reaction, the liquid portion was removed from the suspension by using a filter. The remaining solid portion was washed twice with toluene to give a solid catalyst component having 0.7% by weight of zirconium supported on it.

Polymerization

Sodium chloride (250 g) as a dispersing agent was added to a 2-liter autoclave purged fully with nitrogen, and while the autoclave was heated at 90° C., it was subjected to a pressure reduction treatment for 2 hours by means of a vacuum pump so that the inside pressure of the autoclave became 50 mmHg or below. The temperature of the autoclave was then lowered to 75° C., and the inside of the autoclave was replaced by ethylene. 0.13 millimole of aluminoxane (aluminoxane-I) was then added, and the mixture was stirred at a speed of 50 rpm for 2 minutes. Thereafter, 0.87 millimole of aluminoxane (aluminoxane-I) and 0.015 millimole, as zirconium atom, of the solid catalyst component were added. The autoclave was sealed up. Hydrogen (20N ml) was added and the inside of the autoclave was pressurized with ethylene so that the inside pressure became 8 kg/cm$^2$-G. The stirring speed was increased to 300 rpm, and the polymerization was carried out at 80° C. for 1 hour.

After the polymerization, all the polymer and sodium chloride in the autoclave were taken out, and put in about 1 liter of water. The mixture was stirred for about 5 minutes to dissolve almost all the sodium chloride. Only the polymer came afloat on the water surface. The floating polymer was recovered, washed fully with methanol, and dried overnight at 80° C. under reduced pressure. The amount of the polymer yielded was 93.1 g. The polymer had an MFR of 11.3 and an apparent bulk density of 0.43 g/ml. The amount of a fine powdery polymer having a size of not more than 105 micrometers was 0.1% by weight of the entire polymerization product. A coarse polymer having a size of at least 1120 micrometers was not observed. The Mw/Mn of the polymer was 2.9. The results are shown in Table 6.

Example 32

A solid catalyst component was prepared, and ethylene was polymerized, in the same way as in Example 31 except that in the preparation of the solid catalyst component in Example 31, the amount of the halogenated aluminoxane-I used to treat silica was changed from 2 millimoles to 10 millimoles. The results are shown in Table 6.

Example 33

A solid catalyst component (A) was prepared, and ethylene was polymerized, in the same way as in Example 31 except that in the preparation of the solid catalyst component in Example 31, the temperature employed in the supporting reaction of bis(cyclopentadienyl)zirconium dichloride was changed to 50° C. from 25° C. The solid catalyst component contained 0.7% by weight of Zr supported on it. The results are shown in Table 6.

Example 34

A catalyst component was prepared, and ethylene was polymerized, in the same way as in Example 31 except that in the preparation of the solid catalyst component in Example 31, the amount of bis(cyclopentadienyl)zirconium dichloride was changed from 0.38 millimole to 0.75 millimole, and the amount of the toluene solution of the above zirconium compound was changed from 9.4 ml to 18.8 ml. The amount of Zr supported on the solid catalyst component was 1.2% by weight. The results are shown in Table 6.

Example 35

A solid catalyst component was prepared, and ethylene was polymerized, in the same way as in Example 31 except that in the preparation of the solid catalyst component in Example 31, halogenated aluminoxane-II was used instead of the halogenated aluminoxane-I. The results are shown in Table 6.

Example 36

Ethylene was polymerized in the same way as in Example 31 except that halogenated aluminoxane-II was used instead of the aluminoxane-I at the time of polymerization. The results are shown in Table 6.

Example 37

Polymerization was carried out in the same way as in Example 31 except that a gaseous mixture of 1-butene and ethylene having a butene-1 content of 9.5 mole % was used instead of ethylene alone, and the polymerization temperature was changed from 80° C. to 70° C. The results are shown in Table 7.

TABLE 6

| Example | Polymerization activity (g-PE/mM-Zr) | MFR (dg/min) | Apparent bulk density (g/ml) | Particle size distribution (wt. %) 105 μm and below | Particle size distribution (wt. %) 1120 μm and above |
|---|---|---|---|---|---|
| 31 | 6,200 | 11 | 0.43 | 0.1 | 0 |
| 32 | 5,700 | 17 | 0.42 | 0.1 | 0 |
| 33 | 5,900 | 10 | 0.43 | 0 | 0 |
| 34 | 4,300 | 16 | 0.43 | 0 | 0 |
| 35 | 5,200 | 5 | 0.43 | 0 | 0 |
| 36 | 3,800 | 6 | 0.43 | 0.1 | 0 |

TABLE 7

| Example | Polymerization activity (g-PE/mM-Metal) | MFR (dg/min) | Apparent Bulk density (g/ml) | Density (g/ml) | Amount of the decane-soluble component (wt. %) | $\bar{M}w/\bar{M}n$ |
|---|---|---|---|---|---|---|
| 37 | 5,100 | 18 | 0.37 | 0.918 | 2.8 | 2.9 |

We claim:

1. A solid catalyst for gaseous phase or slurry polymerization of α-olefins, said solid catalyst being formed by (i) providing a carrier comprising a porous inorganic oxide or organic compound having a particle size of 20 to 200 μm;

(ii) depositing a compound of a transition metal and an aluminoxane compound onto said carrier to produce a solid catalyst component having a particle size of 20 to 200 μm wherein said compound of a transition metal is represented by the following formula (I)

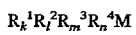

wherein $R^1$ represents a cycloalkadienyl group, $R^2$, $R^3$ and $R^4$ are identical or different and each represents a cycloalkadienyl group, an aryl group, an alkyl group, a cycloalkyl group, an aralkyl group, a halogen atom, a hydrogen atom or a group of the formula —$OR^a$, —$SR^b$ or —$NR_2^c$ in which each of $R^a$, $R^b$ and $R^c$ represents an alkyl group, a cycloalkyl group, an aryl group, an aralkyl group or an organic silyl group, M represents zirconium, titanium or hafnium k is 1, 2, 3 or 4, l, m and n are each 0, 1, 2 or 3, and k+l+m+n=4 wherein said aluminoxane compound is represented by the following formula (II)-1

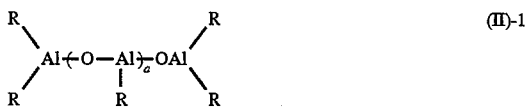

or by the following formula (III)-1

wherein

R represents a hydrocarbon group, in formula (II)-1, a is 2 to 50, and in formula (III)-1, a is 4 to 52, wherein said transition metal of said compound of a transition metal is present in an amount of 0.003 to 3 mmol per gram of said carrier, and wherein said aluminum of said aluminoxane compound is present in an amount such that an atomic ratio of said aluminum to the transition metal of said compound of a transition metal is from 15 to 1000;

(iii) prepolymerizing an α-olefin in an amount of 0.2 to 30 g/g of said solid catalyst component in the presence of said solid catalyst component to form a prepolymer having an intrinsic viscosity (η), measured in decahydronaphthalene at 135° C., of from 0.2 to 20 dl/g.

* * * * *